3,151,173
PROCESS FOR PRODUCING 5-ALKYLIDENE
NORBORNENE
Jack L. Nyce, Mill Creek Hundred, Del., assignor to E. I.
du Pont de Nemours and Company, Wilmington, Del.,
a corporation of Delaware
No Drawing. Filed July 18, 1961, Ser. No. 124,783
10 Claims. (Cl. 260—666)

This invention relates to a new method for the preparation of substituted norbornene compounds. More particularly this invention relates to a new method of preparing 5-alkylidene-norbornene compounds.

Certain norbornene compounds have been found to be very useful for the preparation of ethylene copolymers. Unfortunately, the present methods for the preparation of these norbornene compounds, such as 5-methylenenorbornene, are rather costly and thereby restrict the usefulness of such compounds in commercial production.

It is an object of this invention to provide a new process for the preparation of substituted norbornene compounds. A further object is to provide a new process for the preparation of 5-alkylidene-norbornene compounds. Other objects will appear hereinafter.

These and other objects of this invention are accomplished by a new process which comprises treating a 2-alkylnorbornadiene having the structure

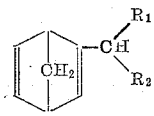

where $R_0$ and $R_2$ are hydrogen atoms or alkyl radicals which can have between them a total of 16 carbon atoms, with a catalyst selected from the group consisting of (a) nonoxidizing acids having a first pKa at 25° C. below about 2.5; and (b) Friedel-Crafts metal halides; and recovering the 5-alkylidenenorbornene,

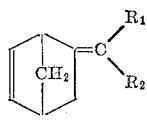

thereby formed, wherein $R_1$ and $R_2$ are as defined above.

Representative examples of the 2-alkylnorbornadienes which can be isomerized according to this invention include: 2-methylnorbornadiene; 2-ethylnorbornadiene; 2-isopropylnorbornadiene; 2-isobutylnorbornadiene; 2-neopentylnorbornadiene; 2-n-heptylnorbornadiene; 2-n-decylnorbornadiene; 2-n-tridecylnorbornadiene; 2-n-hexadecylnorbornadiene; and 2-n-heptadecylnorbornadiene. The 2-alkyl norbornadienes can be made by heating alkyl acetylenes having the formula R—C≡CH, where R is $C_1$-$C_{17}$ alkyl, in the absence of a polymerization initiator with cyclopentadiene, preferably at about 175° to 225° C. for 2 to 24 hours. Closed reaction vessels made from stainless steel or glass-lined steel are quite satisfactory. This class of compounds and a procedure for its preparation are described in Belgian Patent 498,176 (1950).

A catalyst useful for carrying out the isomerization of the present invention should neither oxidize nor add to the carbon-carbon double bonds of the norbornadiene compound during the reaction. Furthermore, it should not significantly promote the polymerization of the unsubstituted carbon-carbon double bond of norbornadiene in competition with the desired isomerization.

Suitable catalysts are selected from the group consisting of (a) non-oxidizing acids having a first pKa at 25° C. below about 2.5, and (b) Friedel-Crafts metal halides.

The first class of catalysts includes compounds such as hydrogen chloride, sulfuric acid, phosphoric acid, and p-toluene sulfonic acid (which is the preferred catalyst of the present invention). Weaker acids, having first pKa values above 2.5, are less effective. The second class of catalysts includes compounds such as boron trifluoride, boron trichloride, aluminum chloride, aluminum bromide, zinc chloride, titanium tetrachloride, ferric chloride, ferric bromide, stannic chloride, antimony pentachloride, niobium tetrachloride, tellurium dichloride, bismuth trichloride, mercuric chloride, and tantulum tetrachloride.

The Friedel-Crafts catalysts tend to induce polymerization which is evidenced by a darkening of the reaction mixture. It is preferred to stop the reaction when this discoloration occurs.

The catalyst concentration may range from about 0.0025 mole to 2.5 mole per mole of the 2-alkylnorbornadiene compound. The preferred concentration often ranges from about 0.02 mole to 0.04 mole. However, when catalysts are used, such as hydrogen chloride, which exhibit a tendency to add to the unsubstituted double bond of the norbornadiene, it is preferred to keep the concentration below about 0.02 mole. Concentrations above 2.5 mole are unnecessary. Concentrations below 0.0025 mole can be used but the conversions to the desired product are not as favorable.

The temperature may range from about 0° to at least 275° C., about 30° to 120° C. being preferred. At temperatures below 0° C. the reaction is undesirably slow and the percent conversion to the desired product is less favorable than that obtained at temperatures above 0° C. A representative temperature when p-toluene sulfonic acid is employed as the catalyst is about 60° C.

The reaction time can vary from about 1 to 100 hours. Representative periods are 2 to 21 hours at 60–61° C. The higher the reaction temperature, the shorter the time required. When darkening of the reaction mixture occurs, it is best to stop in order to minimize polymer formation.

The isomerization can be carried out at sub-atmospheric pressure, atmospheric pressure, or super-atmospheric pressure. Atmospheric pressure is frequently convenient.

No solvent is needed. However, the process of the present invention may be carried out in an inert solvent, that is, an inert liquid solvent which does not interfere with the desired course of the reaction. Any solvent meeting this criterion may be selected by those skilled in the art. In general, it is desirable to pick a solvent which has a low boiling point at atmospheric pressure, that is, a volatile solvent which is readily removed at the end of the reaction and permits ready isolation of the product diolefin. Chloroform is a convenient solvent.

Other representative solvents, which boil between about 30° and 180° C., include: saturated aliphatic hydrocarbons (such as neopentane, isopentane, n-hexane, 2,2,4-trimethylpentane and n-octane); cycloaliphatic hydrocarbons (such as cyclopentane, cyclohexane, and methylcyclohexane); aromatic hydrocarbons (such as: benzene, toluene, orthoxylene, and cumene); halogenated saturated aliphatic hydrocarbons (such as methylene chloride, carbon tetrachloride, 1-bromo-2-chloroethylene, trichloromonofluoromethane, trichlorotrifluoroethane, monofluoroheptafluorocyclobutane, dichlorodifluoroethylene); and halogenated aromatic hydrocarbons (such as chlorobenzene, and orthodichlorobenzene).

The 2-alkyl-norbornadiene concentration in the inert solvent may be varied over a wide range. Those skilled in the art can readily select suitable concentrations for convenient operation. In representative operations about 10 to 25 grams of 2-methyl norbornadiene have been employed in 100 grams of chloroform solvent.

In carrying out the process of the above invention, it is merely necessary to contact the 2-alkyl-norbornadiene compound with the catalyst and recover the isomerized product thereby formed. In general, the product can be separated from unchanged diolefin or by-products by fractional distillation. When a solvent has been used, it can be removed by conventional methods such as evaporation under reduced pressure or by drum drying or the like.

Representative examples of the 5-alkylidene-norbornene compounds which may be prepared according to the present invention include 5-methylidene-2-norbornene (also called 5-methylene-2-norbornene); 5-ethylidene-2-norbornene, which is preferred; 5-isopropylidene-2-norbornene; 5-isobutylidene-2-norbornene; 5-neopentylidene-2-norbornene; 5-n-heptylidene-2-norbornene; 5-n-decylidene-2-norbornene; 5-n-tridecylidene-2-norbornene; 5-n-hexadecylidene-2-norbornene; and 5-n-heptadecylidene-2-norbornene.

These 5-alkylidene-2-norbornenes are significantly useful in the preparation of sulfur-curable hydrocarbon elastomers. The carbon to carbon double bond at the 5-position provides the cure site for the elastomers. These elastomers are rubbery copolymers of ethylene, at least one alpha olefin having the structure $$R\!-\!CH\!=\!CH_2$$

where R is a $C_1$–$C_8$ alkyl radical, and a 5-alkylidene-2-norbornene, said copolymer having an iodine number between 5 and 60 and containing by weight about 20 to 71.4 percent ethylene monomer units, about 25 to 76.4 percent $R\!-\!CH\!=\!CH_2$ monomer units, and about 3.6 to 20 percent 5-alkylidene-2-norbornene monomer units.

Representative examples of these copolymers include: ethylene/propylene/5 - methylidene - 2 - norbornene; ethylene/propylene/5 - ethylidene - 2 - norbornene; ethylene/propylene/5 - isobutylidene - 2 - norbornene; ethylene/propylene/5 - n - heptylidene - 2 - norbornene; ethylene/propylene/5 - n - heptadecylidene - 2 - norbornene; ethylene/1 - butene/5 - ethylidene - 2 - norbornene; ethylene/1 - butene/5 - n - decylidene - 2 - norbornene; ethylene/4,4 - dimethyl - 1 - hexene/5 - ethylidene - 2 - norbornene; ethylene/5,5 - dimethyl - 1 - octene/5 - isopropylidene - 2 - norbornene; ethylene/6 - methyl - 1 - heptene/5 - n - tridecylidene - 2 - norbornene; ethylene/propylene/1 - decene/5 - ethylidene - 2 - norbornene/5 - n-heptylidene - 2 - norbornene; and ethylene/5,6,6 - trimethyl-1-heptene/5-ethylidene-2-norbornene.

These copolymers can be prepared by contacting ethylene, at least one alpha olefin as described, and at least one 5-alkylidene-2-norbornene in solution in inert solvents with coordination catalysts, at temperatures between —20° and 70° C. at atmospheric, subatmospheric, or superatmospheric pressure; and in the absence of catalyst poisons such as oxygen, water, and carbon dioxide.

The following examples will better illustrate the nature of the present invention; however, the invention is not intended to be limited to these examples. Parts are by weight unless otherwise indicated.

EXAMPLE 1

*Isomerization of 2-Methylnorbornadiene With p-Toluene Sulfonic Acid*

The 2-methylnorbornadiene (8 g., 0.07 mole) was placed into a 100 ml. round-bottomed flask equipped with a reflux condenser, magnetic stirrer, and heating mantle. After chloroform (30 cc.) and p-toluene sulfonic acid monohydrate (0.3 g., 0.00157 mole) had been added cold, the mixture obtained was heated at the reflux temperature of chloroform (61° C.) for 17½ hours. The chloroform was then removed by distillation at atmospheric pressure and the residue vacuum distilled to yield 6.7 grams (84%) of diene. Both infrared analysis and vapor phase chromatography showed that the diene consisted of 78% of 5-methylene-norbornene and 22% of 2-methylnorbornadiene.

EXAMPLE 2

*Isomerization of 2-Ethylnorbornadiene With p-Toluene Sulfonic Acid*

The 2-ethylnorbornadiene (6.6 g., 0.0559 mole) was put into a 100 ml. round-bottom flask equipped with a reflux condenser, magnetic stirrer, and heating mantle. After chloroform (30 cc.) and p-toluene sulfonic acid monohydrate (0.3 g., 0.00157 mole) had been added cold, the mixture was heated at the reflux temperature of chloroform for 20 hours. The chloroform was then distilled off at atmospheric pressure and the residue vacuum distilled to give 4.4 g. (67%) of 5-ethylidene-2-norbornene. Both the infrared spectrum and vapor phase chromatography indicated that isomerization had occurred. No trace of the starting diene could be detected by either of the methods mentioned.

EXAMPLE 3

A ten gram sample (0.0816 mole) of 2-methylnorbornadiene, 0.17 milliliter (0.29 g., 0.1 mole) of 85% aqueous phosphoric acid, and 30 milliliters of chloroform were introduced simultaneously into a 250-milliliter flask equipped with a reflux condenser, a magnetic stirrer and a heating mantle. Heat was applied and the mixture, while agitated, was refluxed (61°) over a 3-hour period. The chloroform was then distilled off at atmospheric pressure. After 22 milliliters had been collected, the pressure over the system was reduced and the residue was subjected to vacuum distillation. Three cuts were obtained whose combined weight was 8.7 grams. Infrared analysis showed about 15% chloroform, 81.4% 2-methylnorbornadiene and 3.6% of 5-methylenenorbornene were present. This amounted to a 74% recovery of diene.

EXAMPLE 4

A five gram sample (0.048 mole) of 2-methylnorbornadiene, 85% aqueous phosphoric acid (0.17 milliliter, 0.29 g., 0.1 mole), and chloroform (44.6 g., 30 milliliters) were charged at room temperature into the reaction vessel described in Example 3 above and agitated at reflux (61° C.) for 20 hours. Heat was removed and the reaction mixture was allowed to stand at room temperature for 49 hours. The chloroform was then distilled off. A fraction weighing 2.4 grams was subsequently collected boiling at 39–50° C. (120 mm. Hg) whose infrared spectrum at 11.95 microns indicated the presence of a

bearing compound, showing the formation of 5-methylenenorbornene.

EXAMPLE 5

A sample of 2-methylnorbornadiene (5.3 g., 0.0508 mole) along with aluminum chloride (0.04 g., 0.01 mole) and chloroform (44.6 g., 30 milliliters) were introduced at room temperature into the reaction vessel described in Example 3 above and agitated at reflux (about 61° C.) for 2 hours. After the chloroform had subsequently been distilled off, the pressure on the system was lowered and a fraction was collected weighing 2.5 grams and boiling at 34–50° C. (5–122 mm. Hg); analysis by vapor phase chromatography and infrared absorption (at 11.95 microns) indicated a 5-methylene-2-norbornene content.

EXAMPLE 6

A five gram sample of 2-methylnorbornadiene (5 g., 0.048 mole), p-toluene sulfonic acid monohydrate (0.03 g., 0.000158 mole), and chloroform (44.6 g., 30 milliliters) were introduced into a 100-milliliter round-bottom flask equipped with a magnetic stirrer, a heating mantle, and a condenser. After reflux had occured for 21 hours at atmospheric pressure, a takeoff tube was attached and chloroform was distilled off. The residue was subsequently distilled at 47–55° C. (115 mm. Hg)

to give 3.2 grams of diene containing (according to infrared analysis) 12% 5-methylene-2-norbornene and 87% starting material.

EXAMPLE 7

A sample of p-toluene sulfonic acid monohydrate (0.3 g., 0.00157 mole) was added to 2-methylnorbornadiene (5 g., 0.048 mole) in a 10-milliliter flask which was then immersed for 20 hours in a sand bath kept at 60±5° C. From time to time the flask was briefly removed and shaken. Vacuum distillation gave 3.5 grams of diene containing 94% 5-methylene-2-norbornene and 6% starting material.

As many apparently widely different embodiments of this invention may be made without departing from the spirit and scope thereof, it is to be understood that this invention is not limited to the specific embodiments thereof except as defined in the appended claims.

The embodiments of this invention in which an exclusive property or privilege is claimed are defined as follows:

1. A process for the production of a 5-alkylidene-norbornene comprising contacting a 2-alkyl-norbornadiene with a catalyst selected from the group consisting of non-oxidizing acids having a first pKa at 25° C. below about 2.5 and Friedel-Crafts metal halides, and recovering the 5-alkylidene-norbornene thereby produced, said 2-alkyl-norbornadiene having the structure

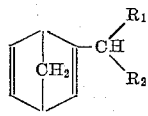

wherein $R_1$ and $R_2$ are separately selected from the group consisting of hydrogen and alkyl radicals of from 1 to 16 carbon atoms, the sum of said carbon atoms comprising $R_1$ and $R_2$ being no greater than 16 and said 5-alkylidene-norbornene having the structure

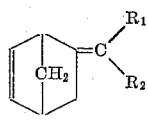

wherein $R_1$ and $R_2$ are as defined above.

2. A process as described in claim 1 wherein said 2-alkyl-norbornadiene is in an inert fluid solvent.
3. A process as described in claim 1 wherein from about 0.0025 to about 2.5 moles of said catalyst is present per mole of 2-alkyl-norbornadiene.
4. A process as described in claim 1 wherein said catalyst is p-toluene sulfonic acid.
5. A process as described in claim 1 wherein said catalyst is aluminum chloride.
6. A process for the production of a 5-alkylidene-norbornene comprising contacting 2-methyl-norbornadiene with p-toluene sulfonic acid, and recovering the 5-methylene-2-norbornene.
7. A process for the production of a 5-alkylidene-norbornene comprising contacting 2-methyl-norbornadiene with aluminum chloride, and recovering the 5-methylene-2-norbornene.
8. A process for the production of a 5-alkylidene-norbornene comprising contacting 2-ethyl-norbornadiene with p-toluene sulfonic acid, and recovering the 5-ethylidene-2-norbornene.
9. A process for the production of a 5-alkylidene-norbornene comprising (1) contacting a 2-alkylnorbornadiene with a catalyst selected from the group consisting of (a) Friedel-Crafts metal halides and (b) an acid selected from the group consisting of hydrogen chloride, sulfuric acid, phosphoric acid and p-toluene sulfonic acid and (2) recovering the 5-alkylidene-norbornene thereby produced, said 2-alkyl-norbornadiene having the structure

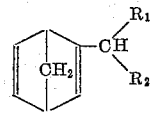

wherein $R_1$ and $R_2$ are separately selected from the group consisting of hydrogen and alkyl radicals of from 1 to 16 carbon atoms, the sum of said carbon atoms comprising $R_1$ and $R_2$ being no greater than 16 and said 5-alkylidene-norbornene having the structure

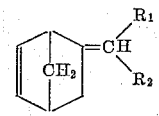

wherein $R_1$ and $R_2$ are as defined above.

10. A process for the production of a 5-alkylidene-norbornene comprising (1) contacting, at a temperature of about 0° C. to 275° C., a 2-alkyl-norbornadiene with a catalyst selected from the group consisting of (a) Friedel-Crafts metal halides and (b) an acid selected from the group consisting of hydrogen chloride, sulfuric acid, phosphoric acid and p-toluene sulfonic acid and (2) recovering the 5-alkylidene-norbornene thereby produced, said 2-alkyl-norbornadiene having the structure

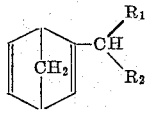

wherein $R_1$ and $R_2$ are separately selected from the group consisting of hydrogen and alkyl radicals of from 1 to 16 carbon atoms, the sum of said carbon atoms comprising $R_1$ and $R_2$ being no greater than 16 and said 5-alkylidene-norbornene having the structure

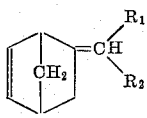

wherein $R_1$ and $R_2$ are as defined above.

References Cited in the file of this patent

UNITED STATES PATENTS

| | | |
|---|---|---|
| 2,730,548 | Bluestone et al. | Jan. 10, 1956 |
| 2,754,337 | Chirtel et al. | July 10, 1956 |
| 2,831,037 | Schmerling | Apr. 15, 1958 |
| 2,956,094 | Feller et al. | Oct. 11, 1960 |